(12) United States Patent
Chung et al.

(10) Patent No.: US 8,585,013 B2
(45) Date of Patent: Nov. 19, 2013

(54) MAGNETIC MICROVALVE USING METAL BALL AND METHOD OF MANUFACTURING THE SAME

(75) Inventors: Kwang Hyo Chung, Daejeon (KR); Yo Han Choi, Daejeon (KR); Dae Sik Lee, Daejeon (KR); Young Jun Kim, Daejeon (KR); Moon Youn Jung, Daejeon (KR); Seon Hee Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 215 days.

(21) Appl. No.: 12/872,289

(22) Filed: Aug. 31, 2010

(65) Prior Publication Data

US 2011/0049401 A1 Mar. 3, 2011

(30) Foreign Application Priority Data

Sep. 1, 2009 (KR) .................. 10-2009-0082217

(51) Int. Cl.
*F16K 31/08* (2006.01)
(52) U.S. Cl.
USPC .................. 251/129.14; 251/65; 251/368
(58) Field of Classification Search
USPC ............................ 251/65, 368, 129.14
See application file for complete search history.

(56) References Cited

U.S. PATENT DOCUMENTS 4,304,260 A * 12/1981 Turner et al. .................. 137/613
4,640,303 A * 2/1987 Greenberg ...................... 137/38
5,746,412 A 5/1998 Niimi
5,807,085 A * 9/1998 Yajima .......................... 417/505
5,863,024 A 1/1999 Blind et al.
5,863,502 A * 1/1999 Southgate et al. ............. 422/417
6,339,366 B1 1/2002 Meisiek
6,581,899 B2 * 6/2003 Williams .......................... 251/7
6,712,925 B1 * 3/2004 Holl et al. ...................... 156/292
6,830,729 B1 * 12/2004 Holl et al. ..................... 422/68.1
7,159,618 B2 * 1/2007 Broyer et al. .................. 137/828

(Continued)

FOREIGN PATENT DOCUMENTS

JP 49-38587 10/1974
JP 8-93947 4/1996

(Continued)

OTHER PUBLICATIONS

"Magnetically controlled valve for flow manipulation in polymer microfluidic devices", Attila Gaspar et al., Microfluid Nanofluid, pp. 525-531, 2008, (Aug. 14, 2007 published online).

*Primary Examiner* — John K Fristoe, Jr.
*Assistant Examiner* — Time Aigbe
(74) *Attorney, Agent, or Firm* — Staas & Halsey LLP

(57) ABSTRACT

There is provided a magnetic microvalve using a metal ball and a method of manufacturing the same. A magnetic microvalve using a metal ball according to an aspect of the invention may include: an upper substrate having a microchannel serving as a passage through which a fluid moves, a fluid inlet through which the fluid flows into the microchannel, and a fluid outlet through which the fluid, having passed through the microchannel, flows out of the microchannel; a lower substrate having a trench locally provided therein; a PDMS/metal ball combination having a metal ball and PDMS surrounding the metal ball so that the metal ball is located in a central portion thereof, the PDMS/metal ball combination being inserted into the trench provided in the lower substrate; and a magnet located above the microchannel, provided in the upper substrate, and generating magnetic force.

9 Claims, 5 Drawing Sheets

(56) References Cited

U.S. PATENT DOCUMENTS

| | | | |
|---|---|---|---|
| 7,169,314 | B2 | 1/2007 | Unger et al. |
| 7,232,109 | B2 | 6/2007 | Driggs et al. |
| 7,314,208 | B1 * | 1/2008 | Rightley .................. 251/65 |
| 7,338,028 | B2 * | 3/2008 | Zimmerling et al. ............ 251/7 |
| 7,494,555 | B2 | 2/2009 | Unger et al. |
| 2003/0102446 | A1 | 6/2003 | Krimmer et al. |
| 2004/0155213 | A1 | 8/2004 | Yoo |
| 2006/0169935 | A1 * | 8/2006 | Yajima ........................... 251/65 |
| 2007/0200081 | A1 * | 8/2007 | Elizarov et al. ............... 251/331 |
| 2007/0251589 | A1 | 11/2007 | Kaji |
| 2008/0163946 | A1 * | 7/2008 | Gomez et al. ................. 137/843 |
| 2010/0051839 | A1 | 3/2010 | Guggenmos et al. |
| 2010/0166610 | A1 | 7/2010 | Arai |

FOREIGN PATENT DOCUMENTS

| | | |
|---|---|---|
| JP | 2007-298126 | 11/2007 |
| JP | 2008-8347 | 1/2008 |
| KR | 10-2005-0055451 | 6/2005 |
| KR | 10-2005-0098408 | 10/2005 |
| KR | 10-2007-0070498 | 7/2007 |
| KR | 10-0752063 | 8/2007 |
| KR | 10-0808391 | 3/2008 |
| KR | 10-2009-0079240 | 7/2009 |
| WO | 2007/080850 | 7/2007 |

* cited by examiner

US 8,585,013 B2

MAGNETIC MICROVALVE USING METAL BALL AND METHOD OF MANUFACTURING THE SAME

CROSS-REFERENCE TO RELATED APPLICATIONS

This application claims the priority of Korean Patent Application No. 10-2009-0082217 filed on Sep. 1, 2009, in the Korean Intellectual Property Office, the disclosure of which is incorporated herein by reference.

BACKGROUND OF THE INVENTION

1. Field of the Invention

The present invention relates to a magnetic microvalve using a metal ball, and more particularly, to a magnetic microvalve using a metal ball and a method of manufacturing the same that can improve the bonding of upper and lower substrates by locally disposing a PDMS/metal ball combination in a lower substrate, provide quick and easy control by magnetic force, and facilitates the manufacturing thereof.

2. Description of the Related Art

In general, in the area of biochips for biochemical analyses, such as DNA chips or protein chips, and lab-on-a-chips based on microfluidics, flow control techniques are required for the stopping, pumping, mixing, distributing, separating and controlling of the fluidic flow of liquid specimens in microchannels. A wide array of control methods have been proposed therefor.

Here, microvalves serve to stop a flow of micro fluids and perform a flow control thereupon, and micropumps serve to pump micro fluids. There is a correlation between these microvalves and these micropumps in terms of the actuation methods thereof. Microvalves and micropumps employing various kinds of methods have been proposed.

For example, as a method of actuating a micropump and a microvalve, there exist a variety of methods including a microactuating method using mechanical pneumatic technology and the PZT (piezoelectric effect), an EHD (electrohydrodynamic) technique, such as an electrophoretic method and an electroosmotic method, an actuating method using electrochemical reactions, an actuating method using variations in thermal, optical and electrical properties of paraffin, gel, porous polymers or beads, a capillary flow method using surface tension, a SAW (surface acoustic wave) method, an actuating method associated with body force control using centrifugal force or the Coriolis force, and an actuating method using changes in the optical properties of surface materials or thermal and electrical charges.

As such, a wide array of micropumps and microvalves employing a variety of actuating methods has been proposed. However, micropumps and microvalves in the related art may have complicated actuating methods, manufacturing methods and control thereof, require expensive materials such as silicone, or may be limited in terms of flow and pressure while being actuated.

Furthermore, as for PDMS pneumatic valves or PDMS magnetic valves using PDMS (polydimethylsiloxane) according to the related art, as a PDMS layer needs to be applied over the entire area of a chip, problems may occur when electrodes are installed, when upper and lower substrates are bonded to each other, or when a sample is absorbed.

Therefore, there is a need for microvalves that are easy to manufacture at low cost and provide quick and easy control.

In particular, there is a need for microvalves using PDMS that can overcome the above-described disadvantages.

SUMMARY OF THE INVENTION

An aspect of the present invention provides a magnetic microvalve using a metal ball and a method of manufacturing the same that can improve the bonding of upper and lower substrates by locally disposing a PDMS/metal ball combination in a lower substrate, provide quick and easy control by using magnetic force, and facilitate the manufacturing thereof.

According to an aspect of the present invention, there is provided a magnetic microvalve using a metal ball, the magnetic microvalve including: an upper substrate having a microchannel serving as a passage through which a fluid moves, a fluid inlet through which the fluid flows into the microchannel, and a fluid outlet through which the fluid, having passed through the microchannel, flows out of the microchannel; a lower substrate having a trench locally provided therein; a PDMS/metal ball combination having a metal ball and PDMS surrounding the metal ball so that the metal ball is located in a central portion thereof, the PDMS/metal ball combination being inserted into the trench provided in the lower substrate; and a magnet located above the microchannel, provided in the upper substrate, and generating magnetic force.

A vent hole may be provided in a portion of the lower substrate located under a region thereof, into which the PDMS/metal ball combination is inserted.

The magnet may be realized as a permanent magnet or an electromagnet.

When magnetic force is exerted by the magnet and applied to the metal ball, the metal ball may be pulled towards the upper substrate, and the microchannel may be closed by the PDMS surrounding the metal ball.

The microchannel may be opened by an elastic return force of the PDMS when the magnetic force, exerted by the magnet, is removed.

The PDMS/metal ball combination may be provided such that a PDMS layer having a predetermined thickness is located between the metal ball and the microchannel to be placed above the PDMS/metal ball combination.

The predetermined thickness may be 0.1 to 2 times greater than a height of the microchannel.

The PDMS/metal ball combination may have side surfaces inclined relative to a top surface by an arbitrary angle other than 90°.

The trench may be formed by a polymer replication technique including injection molding or hot embossing.

The lower substrate may include any one selected from a polymer group consisting of PMMA (polymethylmethacrylate), PC (polycarbonate), COC (cycloolefin copolymer), PA (polyamide), PE (polyethylene), PP (polypropylene), PPE (polyphenylene ether), PS (polystyrene), POM (polyoxymethylene), PEEK (polyetheretherketone), PTFE (polytetrafluoroethylene), PVC (polyvinyl chloride), PVDF (polyvinylidene fluoride), PBT (polybutylene terephthalate), FEP (fluorinated ethylene propylene), and PFA (perfluoralkoxyalkane).

According to an aspect of the present invention, there is provided a method of manufacturing a magnetic microvalve, the method including: forming an upper substrate having a microchannel serving as a passage through which a fluid moves, a fluid inlet, and a fluid outlet; forming a lower substrate having a trench locally formed therein; inserting a PDMS/metal ball combination into the trench in the lower substrate, the PDMS/metal ball having a metal ball and PDMS surrounding the metal ball so that the metal ball is located in a central portion thereof; and bonding the upper substrate and the lower substrate to each other.

The method may further include forming the PDMS/metal ball combination.

The forming of the PDMS/metal ball combination may include: forming a frame having the same size and shape as those of the trench formed in the lower substrate; inserting the metal ball into the frame; fixing the metal ball and pouring a PDMS solution in the frame; flattening a top surface of the PDMS solution poured in the frame; and solidifying the metal ball and the PDMS surrounding the metal ball at the same time.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
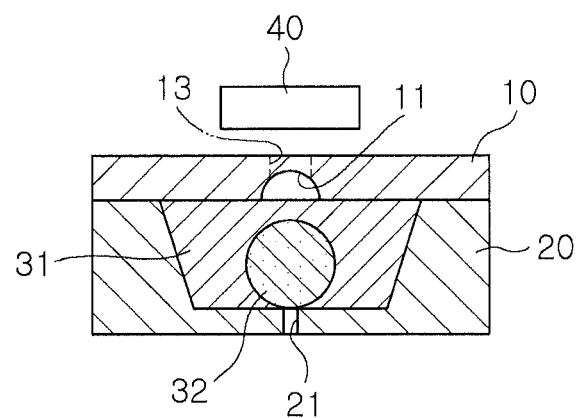
FIGS. 1A and 1B are cross-sectional views illustrating a magnetic microvalve using a metal ball according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

It will be understood that when an element is referred to as being "connected with" another element, it can be directly connected with the other element or intervening elements may also be present. In contrast, when an element is referred to as being "directly connected with" another element, there are no intervening elements present. In addition, unless explicitly described to the contrary, the word "comprise" and variations such as "comprises" or "comprising," will be understood to imply the inclusion of stated elements but not the exclusion of any other elements.

First, the structure and operation of a magnetic microvalve using a metal ball according to an exemplary of the invention will be described with reference to FIGS. 1A and 1B and 2.

Figure 1B:
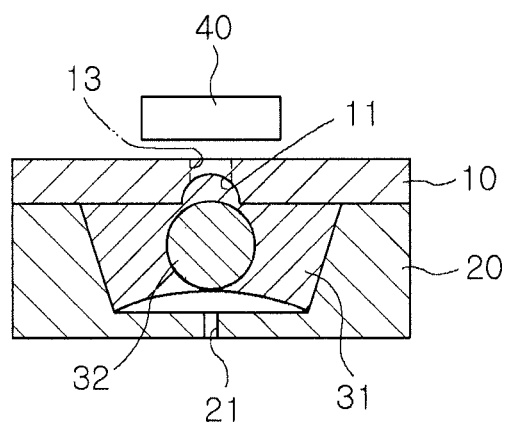

FIGS. 1A and 1B are cross-sectional views illustrating a magnetic microvalve using a metal ball according to an exemplary embodiment of the invention. In FIG. 1A, a micro channel is opened, since magnetic force is not applied thereto. In FIG. 1B, a microchannel is closed after a metal ball is pulled towards the microchannel by magnetic force. FIG. 2 is a perspective view illustrating a magnetic microvalve using a metal ball according to an exemplary embodiment of the invention.

A magnetic microvalve using a metal ball according to an exemplary embodiment of the invention includes an upper substrate 10, a lower substrate 20, a combination of PDMS 31 and a metal ball 32 (hereinafter, also referred to as a "PDMS/metal ball combination"), and a magnet 40.

A microchannel 11 is formed in the upper substrate 10 so that a fluid moves in the microchannel 11. A fluid inlet 12 is formed at one end of the microchannel 11, while a fluid outlet 13 is formed at the other end thereof. A fluid flows into the microchannel 11 through the fluid inlet 12 and flows out of the microchannel 11 through the fluid outlet 13.

A trench is formed in the lower substrate 20, and the combination of the PDMS 31 and the metal ball 32 is then inserted into the trench. Also, a vent hole 21 is formed in a portion of the lower substrate 20, located under a region into which the combination of the PDMS 31 and the metal ball 32 is inserted, thereby preventing negative pressure from being applied when the microchannel 11 is closed by the combination of the PDMS 31 and the metal ball 32. As a result, the operation of the microvalve can be readily performed.

The trench, which is locally formed inside the lower substrate 20, may be formed using a polymer replication technique including injection molding or hot embossing. To this end, the lower substrate 20 may be formed of a kind of polymer, such as PMMA (polymethylmethacrylate), PC (polycarbonate), COC (cycloolefin copolymer), PA (polyamide), PE (polyethylene), PP (polypropylene), PPE (polyphenylene ether), PS (polystyrene), POM (polyoxymethylene), PEEK (polyetheretherketone), PTFE (polytetrafluoroethylene), PVC (polyvinyl chloride), PVDF (polyvinylidene fluoride), PBT (polybutylene terephthalate), FEP (fluorinated ethylene propylene), or PFA (perfluoralkoxyalkane).

The upper substrate 10 and the lower substrate 20 are bonded to each other by thermal bonding or by using an adhesive.

The combination of the PDMS 31 and the metal ball 32 is configured such that the PDMS 31, being solidified, surrounds the metal ball 32 so that the metal ball 32 can be located in a central portion thereof. The combination of the PDMS 31 and the metal ball 32 may be formed into various configurations, which will be described below with reference to FIGS. 4A through 4C.

The magnet 40 is located above the microchannel 11, provided on the upper substrate 10. Here, the magnet 40 may come into contact with the upper substrate 10 or be separated from the upper substrate 10 by a predetermined distance. Here, the magnet 40 may be a permanent magnet creating its own persistent magnetic field or an electromagnet producing a varying magnetic field.

When magnetic force is exerted by the magnet 40, the metal ball 32, surrounded by the PDMS 31, is pulled towards the magnet 40, that is, towards the upper substrate 10, so that the microchannel 11 is closed due to the elastic deformation of the PDMS 31.

On the other hand, in the case that the magnetic force, exerted by the magnet 40, is eliminated, the force by which the metal ball 32 is pulled disappears, so that the microchannel 11 is opened by an elastic return force of the PDMS 31.

As such, the magnetic microvalve according to this embodiment can be easily opened and closed by interaction between the metal ball 32, inserted into the PDMS 31, and the magnet 40, located above the microchannel 11.

A configuration of a PDMS/metal ball combination, being used in a magnetic microvalve according to an exemplary embodiment of the invention, will be described in detail with reference to FIGS. 3 and 4A through 4C.

Figure 3:
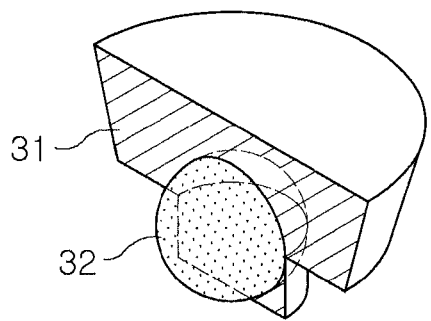
FIG. 3 is a perspective view illustrating a PDMS/metal ball combination according to an exemplary embodiment of the present invention.
Figure 4A:
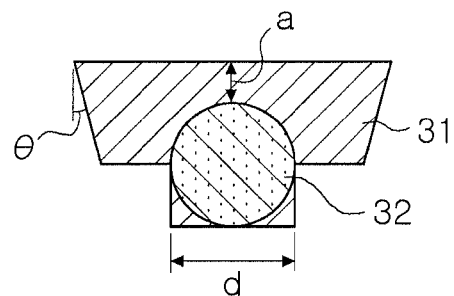
FIGS. 4A through 4C are cross-sectional views illustrating the configuration of a PDMS/metal ball combination according to various embodiments of the present invention.
Figure 4B:
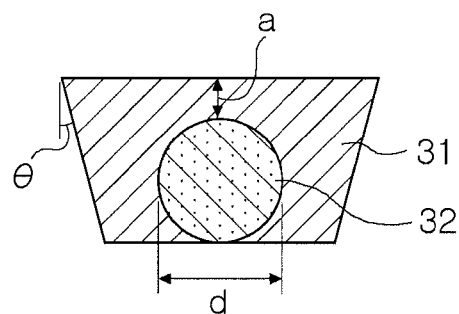
Figure 4C:
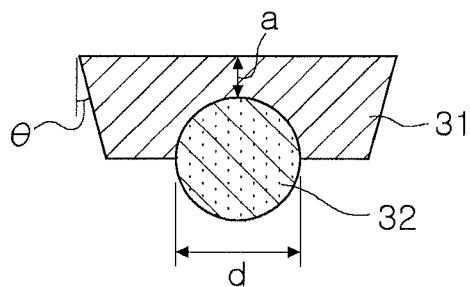

FIG. 3 is a perspective view illustrating a PDMS/metal ball combination according to an exemplary embodiment of the invention. FIGS. 4A through 4C are cross-sectional views illustrating the configuration of a PDMS/metal ball combination according to various embodiments of the invention.

As shown in FIG. 3, the PDMS/metal ball combination is configured in which the PDMS 31, being solidified, surrounds the metal ball 32 so that the metal ball 32 is located in a central portion thereof.

Furthermore, the PDMS/metal ball combination may have various configurations as shown in FIGS. 4A through 4C.

Here, the metal ball 32 is located in a lower layer of the PDMS 31 so that a PDMS layer having a predetermined thickness is located between the metal ball 32 and the microchannel to be disposed above the PDMS/metal ball combination. In particular, the predetermined thickness a may be 0.1 to 2 times greater than a thickness of the microchannel.

Furthermore, when a PDMS/metal ball combination, which is manufactured separately from a lower substrate, is then inserted into the trench of the lower substrate, side surfaces of the PDMS/metal ball combination may be inclined relative to a top surface thereof by an angle of $(90-\theta)°$ so that a frame, used to form a PDMS/metal ball combination, is separated easily from the PDMS/metal ball combination.

The performance of the microvalve, including the maximum allowable pressure of a microchannel, a valve response time, and fluid flow can be controlled according to a geometric shape of the PDMS/metal ball combination, illustrated in FIGS. 4A through 4C, a diameter d of a metal ball, a thickness a of a PDMS layer between the microchannel and the metal ball 32, and the magnitude of the magnetic force being exerted on the magnet.

For example, the maximum allowable pressure can be increased by increasing the diameter d of the metal ball 32 and the magnitude of the magnetic force of the magnet. Furthermore, the flow of fluids flowing through the microvalve can be controlled by adjusting the magnitude of the magnetic force of the microvalve.

Also, while being manufactured separately from a substrate, a PDMS/metal ball combination may be mass-produced to a standard size and be used to form a microvalve.

A process of manufacturing a magnetic microvalve using a metal ball according to another exemplary embodiment of the invention will be described in detail with reference to FIGS. 5 and 6.

Figure 5:
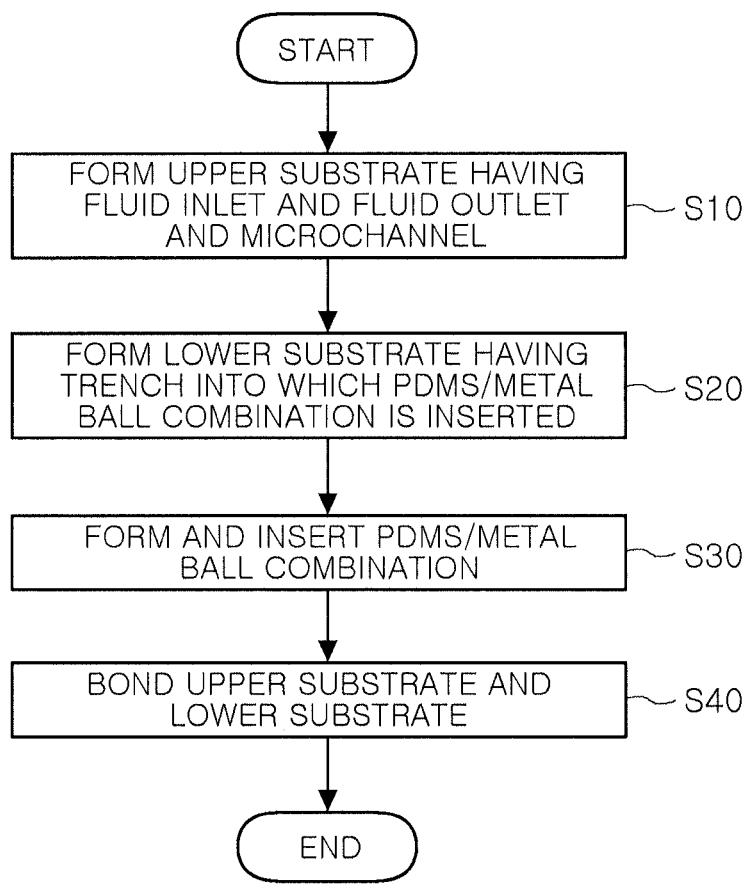
FIG. 5 is a flowchart illustrating a process of manufacturing a magnetic microvalve using a metal ball according to an exemplary embodiment of the present invention.

FIG. 5 is a flowchart illustrating a process of manufacturing a magnetic microvalve using a metal ball according to another exemplary embodiment of the invention.

First, an upper substrate having a microchannel and a fluid inlet and a fluid outlet formed at both ends of the microchannel is formed in operation S10.

A lower substrate having a trench into which a PDMS/metal ball combination will be inserted is formed in operation S20. Here, a vent hole may further be formed in a portion of the lower substrate located under a region into which the PDMS/metal ball combination will be inserted.

The PDMS/metal ball combination is then formed, and inserted into the trench formed in the lower substrate in operation S30. A process of forming a PDMS/metal ball combination will be described below with reference to FIG. 6. Alternatively, before a process of manufacturing a microvalve starts, only a PDMS/metal ball combination is separately manufactured in advance, and the microvalve may be manufactured using the PDMS/metal ball combination being previously manufactured.

Subsequently, the upper substrate and the lower substrate are bonded to each other by thermal bonding or by using an adhesive in operation S40.

Figure 2:
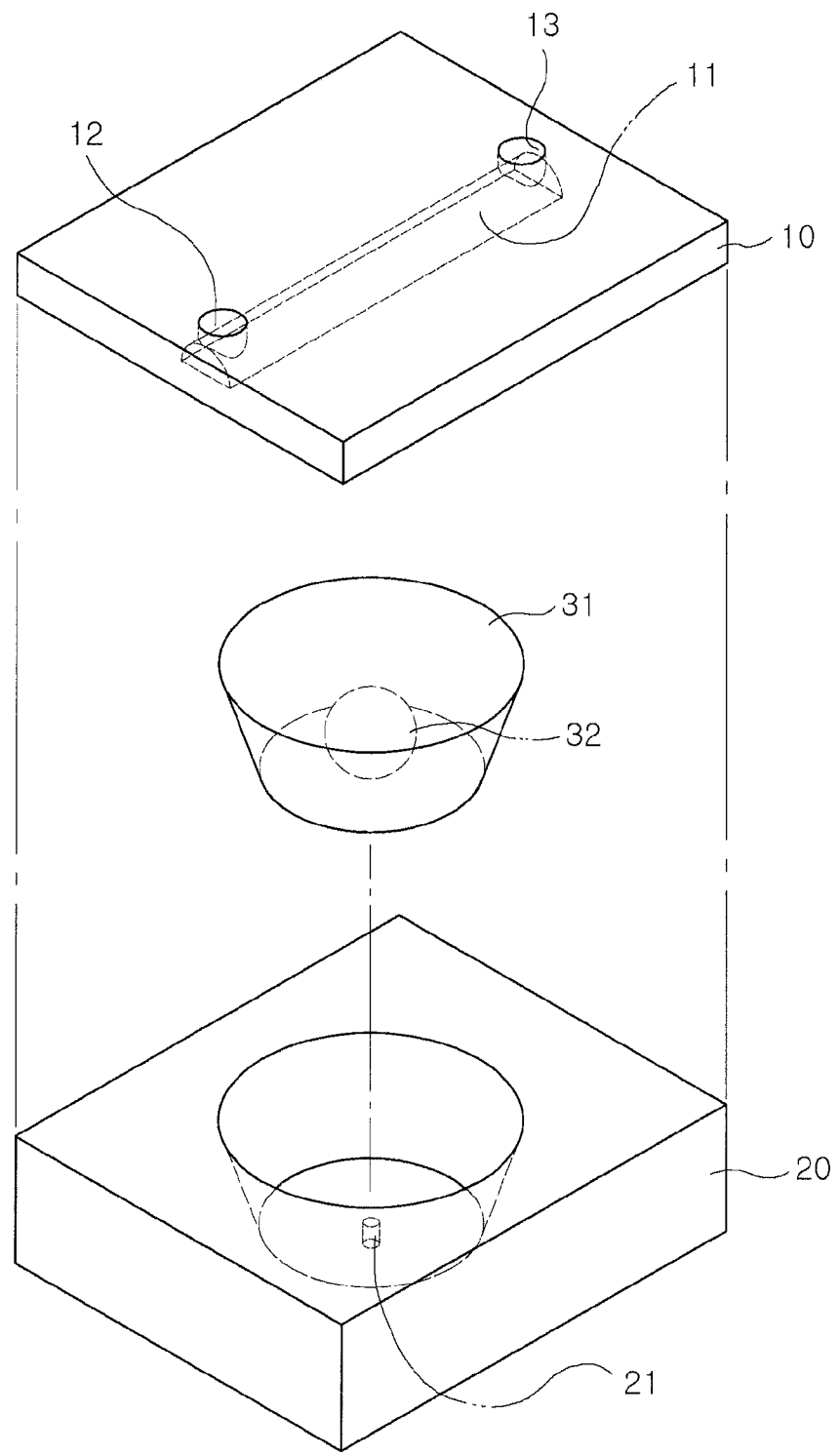
FIG. 2 is a perspective view illustrating a magnetic microvalve using a metal ball according to an exemplary embodiment of the present invention.

The configuration of the magnetic microvalve using the metal ball according to the above-described manufacturing process is the same as the description having been made with reference to FIGS. 1 and 2. Thus, a detailed description thereof will be omitted.

Figure 6:
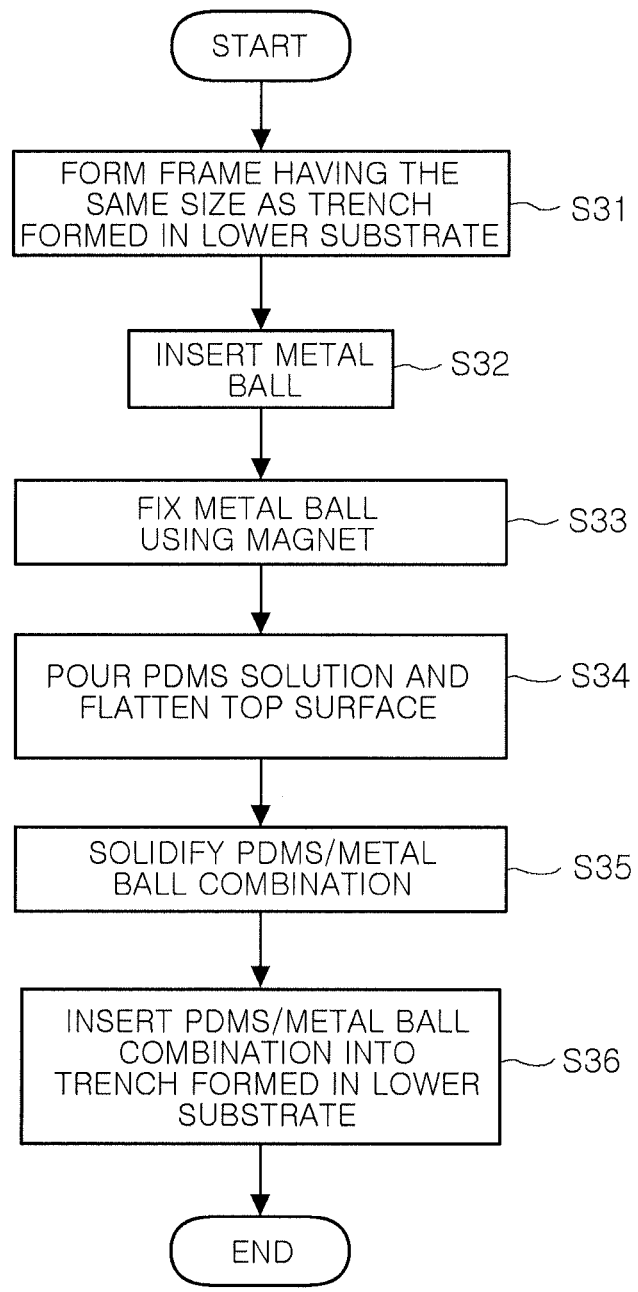
FIG. 6 is a flowchart illustrating a process of forming a PDMS/metal ball combination according to another exemplary embodiment of the present invention.

FIG. 6 is a flowchart illustrating a process of forming a PDMS/metal ball combination according to another exemplary embodiment of the invention.

First, a frame having the same size and shape as those of a trench of a lower substrate, into which a PDMS/metal ball combination will be inserted, is formed in operation S31.

A metal ball is then inserted into the frame in operation S32, and the metal ball is fixed using a device such as a magnet in operation S33.

Subsequently, a PDMS solution is poured into the frame and a heavy flat panel is loaded over the PDMS solution to thereby flatten the top surface of the PDMS solution in operation S34, and the metal ball and the PDMS solution are solidified in operation at the same time in operation S35 to thereby form a PDMS/metal ball combination.

The PDMS/metal ball combination, formed using the above-described process, is separated from the frame, and is then inserted into the trench of the lower substrate in operation S36, thereby forming a microvalve. The configuration of the PDMS/metal ball combination is the same as the configuration of the PDMS/metal ball according to the embodiment, having been described in detail with reference to FIGS. 3 and 4A through 4C. Thus, a detailed description thereof will be omitted.

As set forth above, according to exemplary embodiments of the invention, a PDMS/metal ball combination is locally provided within a chip to thereby close a microchannel, so that disadvantages associated with a microvalve using PDMS according to the related art can be overcome.

Furthermore, quick and easy control of a microvalve can be provided using a permanent magnet or an electromagnet, and a PDMS/metal ball combination is separately manufactured and is then inserted into a trench, formed in a substrate, thereby allowing for the quick and easy manufacture of a microvalve.

While the present invention has been shown and described in connection with the exemplary embodiments, it will be apparent to those skilled in the art that modifications and variations can be made without departing from the spirit and scope of the invention as defined by the appended claims.

What is claimed is:

1. A magnetic microvalve using a metal ball, the magnetic microvalve comprising:

an upper substrate having a microchannel serving as a passage through which a fluid moves, a fluid inlet through which the fluid flows into the microchannel, and a fluid outlet through which the fluid, having passed through the microchannel, flows out of the microchannel;

a lower substrate having a trench locally provided therein;

a PDMS/metal ball combination having a metal ball and PDMS surrounding the metal ball so that the metal ball is located in a central portion thereof, the PDMS/metal ball combination being fully inserted into the trench provided in the lower substrate; and an external magnet located above the microchannel, provided in the upper substrate or below the lower substrate under the microchannel, and generating magnetic force, wherein the PDMS surrounding the PDMS/metal ball combination closes the micro channel by deforming the PDMS surrounding the PDMS/metal ball combination upon magnetic force pulling the PDMS/metal ball combination.

2. The magnetic microvalve of claim 1, wherein the magnet is realized as a permanent magnet or an electromagnet.

3. The magnetic microvalve of claim 1, wherein when magnetic force is exerted by the external magnet and applied to the metal ball, the metal ball is pulled towards the upper substrate, and the microchannel is closed by the PDMS surrounding the metal ball.

4. The magnetic microvalve of claim 3, wherein the microchannel is opened by an elastic return force of the PDMS when the magnetic force, exerted by the external magnet, is removed.

5. The magnetic microvalve of claim 1, wherein the PDMS/metal ball combination is provided such that a PDMS layer having a predetermined thickness is located between the metal ball and the microchannel to be placed above the PDMS/metal ball combination.

6. The magnetic microvalve of claim 5, wherein the predetermined thickness is 0.1 to 2 times greater than a height of the microchannel.

7. The magnetic microvalve of claim 1, wherein the PDMS/metal ball combination has side surfaces inclined relative to a top surface by an arbitrary angle other than 90°.

8. The magnetic microvalve of claim 1, wherein the trench is formed by a polymer replication technique including injection molding or hot embossing.

9. The magnetic microvalve of claim 8, wherein the lower substrate comprises any one selected from a polymer group consisting of PMMA (polymethylmethacrylate), PC (polycarbonate), COC (cycloolefin copolymer), PA (polyamide), PE (polyethylene), PP (polypropylene), PPE (polyphenylene ether), PS (polystyrene), POM (polyoxymethylene), PEEK (polyetheretherketone), PTFE (polytetrafluoroethylene), PVC (polyvinyl chloride), PVDF (polyvinylidene fluoride), PBT (polybutylene terephthalate), FEP (fluorinated ethylene propylene), and PFA (perfluoralkoxyalkane).

\* \* \* \* \*